United States Patent [19]
Cooper et al.

[11] 3,949,257
[45] Apr. 6, 1976

[54] END WINDING CONDUCTOR SECURING ARRANGEMENT

[75] Inventors: Glenn D. Cooper, North Huntingdon; John D. Pharr, Jr., Wilkinsburg, both of Pa.

[73] Assignee: Westinghouse Electric Corporation, Pittsburgh, Pa.

[22] Filed: Jan. 23, 1975

[21] Appl. No.: 543,378

[52] U.S. Cl. .............................. 310/260; 310/270
[51] Int. Cl.² ........................................ H02K 3/46
[58] Field of Search .......... 310/194, 260, 270, 271, 310/273, 214, 215, 66; 277/34; 336/185, 208

[56] References Cited
UNITED STATES PATENTS

| | | | |
|---|---|---|---|
| 2,648,018 | 8/1953 | Meier | 310/43 |
| 2,749,456 | 6/1956 | Luenberger | 310/43 |
| 2,961,555 | 11/1960 | Towne | 310/43 |
| 2,994,735 | 8/1961 | Marshall | 310/260 |
| 3,344,296 | 9/1967 | Coggeshall | 310/260 |
| 3,360,273 | 12/1967 | Hundt | 277/34 |
| 3,562,569 | 2/1971 | Koechlin | 310/214 |

FOREIGN PATENTS OR APPLICATIONS

| | | | |
|---|---|---|---|
| 1,250,540 | 9/1967 | Germany | 310/260 |

*Primary Examiner*—R. Skudy
*Attorney, Agent, or Firm*—J. R. Hanway

[57] ABSTRACT

Apparatus for securing the end winding conductors of turbine generators. Support rings extend around the end winding conductors and are braced against the conductors by resin filled hoses located therebetween. The hoses extend around the circumference of the support rings and are pressure filled with a curable resin to produce a force between the conductors and the support rings.

8 Claims, 6 Drawing Figures

FIG. I.

END WINDING CONDUCTOR SECURING ARRANGEMENT

BACKGROUND OF THE INVENTION

1. Field of the Invention

This invention relates, in general, to conductor securing arrangements and, more specifically, to apparatus for radially securing the end winding conductors of turbine generators.

2. Description of the Prior Art

Conventional arrangements for bracing or securing the end winding conductors of large turbine generators utilize conformable pads or blocks located between the conductors and the various support rings which usually extend around the end winding structure. These pads normally consist of a resin impregnated, substantially resilient material, such as Dacron felt, which is placed in the desired location before the resin has cured. When a relatively thick pad is desired, normally the impregnated material is wrapped around a solid block of suitable non-metallic material, such as Micarta.

Conformable spacing members formed by the above described procedure must have a reasonably definite initial thickness to properly support and brace the winding conductors. This requirement makes it necessary to construct a large number of different sized pads, thus complicating the construction of the generator. Although the pads are compressed when inserted between conductors and various rings, it is difficult to achieve or maintain control over the degree of tightness between the filler pads and conductors. A tight fit or residual pressure between pads and conductors is desirable to keep the conductors tight over long periods of normal operation with associated mechanical vibration and during abnormal short-circuit or fault conditions during which very large electromagnetic forces are applied to the conductors. A spacing ring or hoop using the same teachings as the conformable spacing member is disclosed in U.S. Pat. No. 3,344,297.

Therefore, it is desirable, and it is an object of this invention, to provide an end winding conductor securing arrangement which tightly braces the conductors to the support rings without the necessity of using a plurality of conformable spacers.

SUMMARY OF THE INVENTION

There is disclosed herein a new and useful arrangement for securing the end winding conductors of turbine generators. Support rings are positioned around inside and outside surfaces which are defined by the end winding conductors. Additional support rings are disposed between the end winding conductors. Reinforced hoses occupy the regions between the rings and the conductors and extend around the circumference of the rings. The hoses are filled, under pressure, with an epoxy resin which hardens to maintain a pressure between the conductors and the support rings, thus providing a tight radial support for the end winding conductors. The hoses expand in the regions between adjacent conductors, thus also providing tangential support for the end winding conductors.

BRIEF DESCRIPTION OF THE DRAWING

Further advantages and uses of this invention will become more apparent when considered in view of the following detailed description and drawing, in which.

DESCRIPTION OF THE PREFERRED EMBODIMENTS

Figure 1:
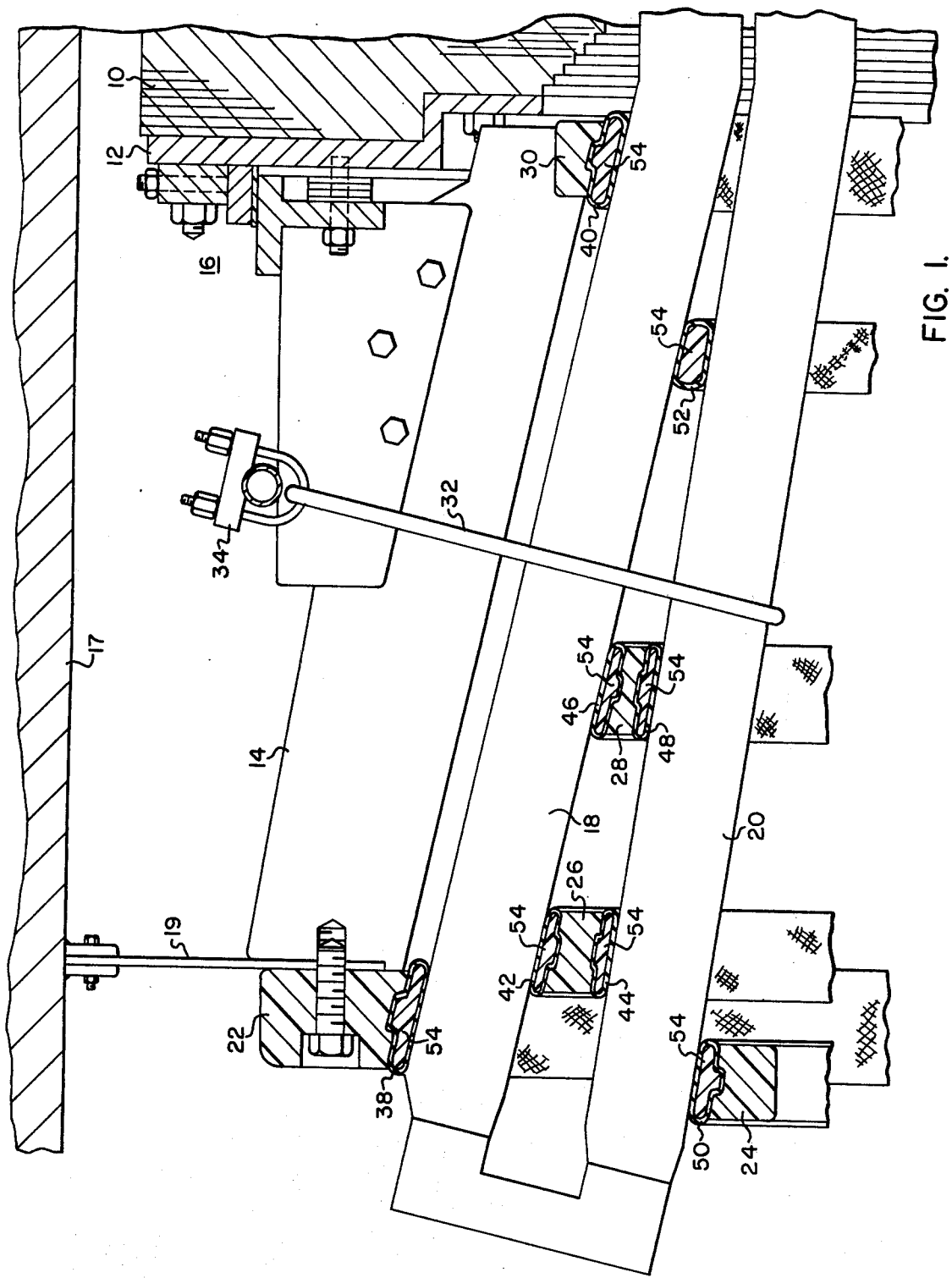
FIG. 1 is a partial view of a turbine generator end winding conductor securing arrangement constructed according to this invention.

Throughout the following description, similar reference characters refer to similar elements or members in all of the figures of the drawing.

Referring now to the drawing, and to FIG. 1 in particular, there is shown the end winding portion of a turbine generator constructed according to this invention. The generator includes the stator iron core 10 which is held together with the aid of the core support plate 12. The support bracket 14 is connected to the core support plate 12 by the members 16. Although only one support bracket is illustrated in FIG. 1, turbine generators usually include a plurality of similar support brackets located in a conical plane which has an axis conincident with the axis of the generator. Only the bracket 14 is illustrated in FIG. 1 in the interest of clarity.

The bottom end winding conductor 18 and the top end winding conductor 20 extend from slots in the stator iron core 10 and are secured to the support bracket 14 and to each other. The top and bottom end winding conductors are firmly secured with respect to each other by the supporting rings 22, 24, 26, 28 and 30. The entire end winding assembly is secured to the bracket 14 by the band 32 which is tensioned by the clamp 34 to pull the conductors toward the bracket 14. The entire assembly is also supported from the generator casing 17 by the strap 19.

The support rings are constructed of a suitable non-metallic material such as a glass reinforced epoxy resin. The rings positioned around the outside surface defined by the bottom conductor 18, and by the other bottom conductors of the end winding structure which are not illustrated in FIG. 1, restrict the outward radial movement of the end winding conductor assembly. The support ring 24 which is located on the inside surface which is defined by the top end winding conductors prevents radially inward movement of the end winding conductor assembly. The support rings 26 and 28 are positioned between the bottom conductor 18 and the top conductor 20 to establish and maintain the integral structure of the top and bottom conductors of the end winding conductor assembly. Thus, with the support rings around the inside, the outside, and between the end winding conductors, the end winding conductors 18 and 20 can only be moved in a combined assembly rather than each conductor separately.

The hoses 38, 40, 42, 44, 46, 48 and 50 are positioned between their respective support rings and the conductors 18 and 20. These hoses are constructed and positioned to exert a force between the support rings and the adjacent conductors to tighten the supporting arrangement and to prevent movement of the conductors during normal and abnormal operation of the turbine generator. The hose 52 is positioned between the conductors 18 and 20 for the same reason although not associated with a rigid support ring. The hoses extend in a substantially circular path around the longitudinal axis of the turbine generator and substantially in line with the support ring to which they are adjacent. Each hose is filled with a solid material 54 which initially consisted of a liquid resin material which was injected into the hose under pressure and allowed to cure in place. Since the hoses are constructed of flexible materials and seek to obtain a substantially circular cross-sectional shape when pressurized by the solid material 54, a pressure is created between the support rings and the end winding conductors. This pressure tightly holds the end winding conductors together and creates a rigid conductor assembly which contains top and bottom end winding conductors that can not be moved relative to each other.

Figure 2:
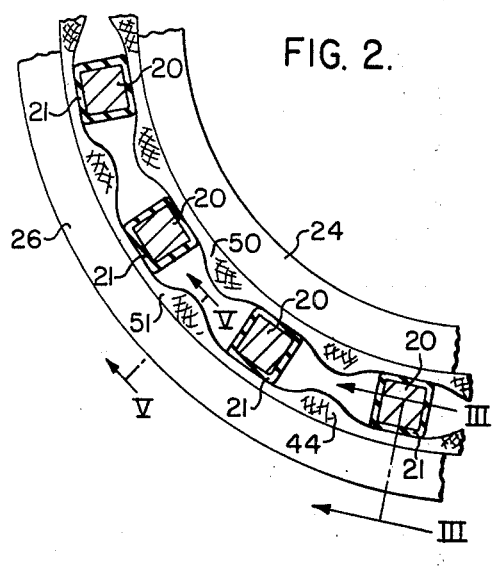
FIG. 2 is a partial view illustrating the arrangement for securing conductors to a support ring.

FIG. 2 is a partial view looking in at the end of a turbine generator constructed according to the embodiment illustrated in FIG. 1. The top conductors 20 include the insulation 21 therearound and are positioned between the support rings 24 and 26 as illustrated in FIG. 2. The hoses 50 and 44 are positioned around the support rings 24 and 26, respectively, and between the top end winding conductors 20. It can be seen from FIG. 2 that the force produced between the support rings and the conductors by the hoses tends to lock or fix the radial position of the conductors 20 with respect to the support rings 24 and 26. In addition, since the pressure in the hoses 50 and 44 tends to bulge the hoses in the regions between adjacent conductors, such as the region 51, the tangential movement of the conductors 20 is also restricted by the securing arrangement of this invention.

Figure 3:
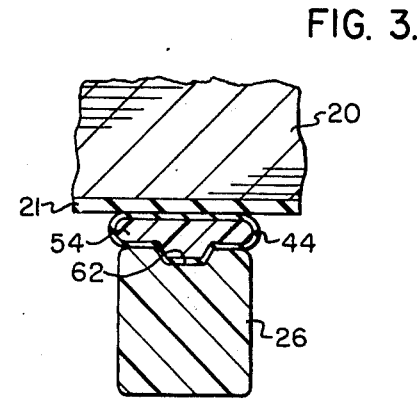
FIG. 3 is a cross-sectional view taken generally along the line III—III of FIG. 2.

FIG. 3 is a partial cross-sectional view of the end winding conductor securing assembly shown in FIG. 2 taken generally along the line III—III of FIG. 2. The support ring 26, as well as the other support rings described herein, contains a notch 62 into which the hose 44 projects when it is filled under pressure by the material 54. This prevents lateral movement of the hose 44 and the ring 26, and increases the overall integrity of the end winding securing arrangement. The notch 62 also assumes that at least a partial opening through the hose 44 exists at all times.

The hose 44 may be constructed of any suitable material which will withstand the temperatures and pressures utilized in the construction of the end winding conductor securing arrangement. A hose having a polyester braided outer cover which is lined with a butyl rubber material has been found suitable for such applications. Since the hose is initially flexible and the resin material 54 is initially in a fluid state, injecting the resin material into the hose 44 tends to create a circular cross-sectional area in the hose 44 in the regions immediately between the conductor 20 and the support ring 26. Since a circular shape cannot be attained due to the boundaries established by the conductor 20 and the support ring 26, a large pressure is established between the conductor 20 and the support ring 26. This force tends to separate the conductor 20 from the support ring 26, but, with the other elements of the securing assembly, the relative distance between the support ring 26 and the conductor 20 is substantially fixed and a large pressure is produced by the hose 44.

Figure 4:
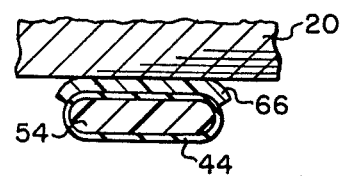
FIG. 4 is a cross-sectional view illustrating the use of a filler member between a hose and a conductor.

FIG. 4 illustrates the use of an auxiliary layer 66 of a suitable material which is positioned between the hose 44 and the conductor 20, or between the hose 44 and any other member when desired. The layer 66 increases the strength of the braided outer surface of the hose 44 and would normally be used when the conductor 20 or other adjacent surface might puncture the covering of the hose 44 before the resin material 54 solidifies. The layer 66 also provides a smoother surface than the hose surface.

Figure 5:
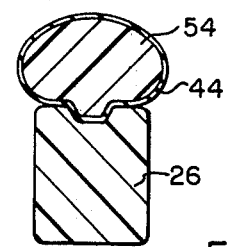
FIG. 5 is a cross-sectional view taken generally along the line V—V of FIG. 2.

FIG. 5 is a partial cross-sectional view taken generally along the line V—V shown in FIG. 2. FIG. 5 illustrates the relative cross-sectional shape of the hose 44 at a position which is located tangentially between adjacent conductors 20. Since the hose 44 is only restricted against expansion on one side thereof by the support ring 26, the hose 44 has a tendency to obtain its normally inflated shape. Thus, the conductor 20 is effectively locked in position tangentially by the increased diameter of the hose in the regions between adjacent conductors.

Figure 6:
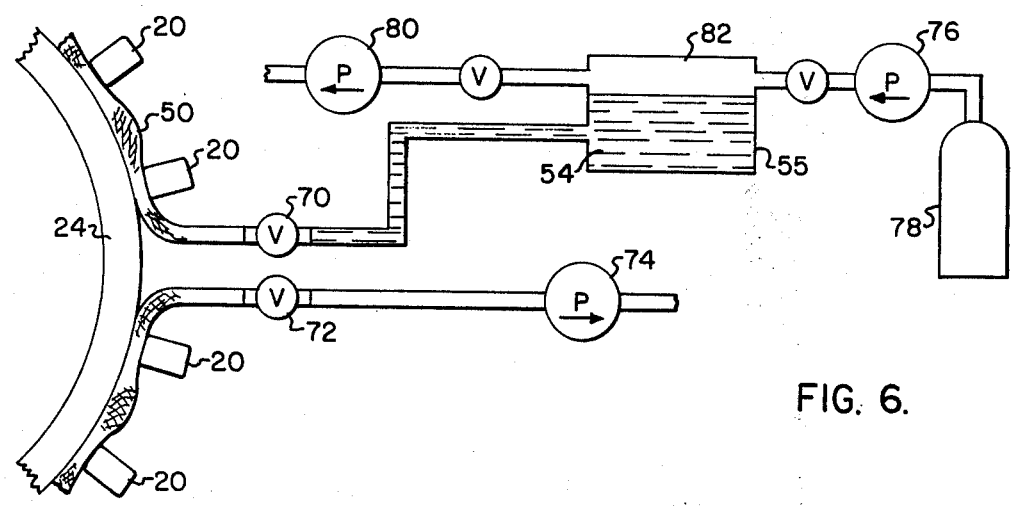
FIG. 6 is a diagrammatic view illustrating a method which may be used for constructing the end winding securing arrangement shown in FIG. 1.

FIG. 6 is a diagrammatic view illustrating a process which may be used in constructing the securing arrangement shown in FIG. 1. The hose 50 is wrapped substantially around the entire circumference of the support ring 24 and is provided with suitable couplings and valves 70 and 72 at each end thereof. The conductors 20 are positioned on the hose as shown and are also surrounded on their outside surface by another hose and support ring, which are not shown, to limit the outward movement of the conductors 20. The hose is evacuated by the vacuum pump 74 and, at the same time, a suitable material 54 is forced into the hose under the pressure created by the pump 76. An inert gas, such as nitrogen, contained in the tank 78 may be used instead of the pump 76 to create the pressure on the resin material 54 to force the material 54 into the hose. The pump 80 may be used, prior to creating the pressure in the region 82 above the material 54, to evacuate the region 82 of undesirable pressure producing gases, thereby permitting only the entry of the inert gas into contact with the material 54. Once the resin material 54 has been pushed through the entire length of the hose 50, it is allowed to cure and obtain a substantial degree of hardness before the pressure which forces the material 54 through the hose is removed. Thus, the initial pressure exerted by the material 54 in the fluid state remains existent after the material 54 cures to a solid state. According to the method used, the tank 55 which contains the resin 54 may or may not be disconnected during the curing process.

All of the hoses contained in the end winding securing arrangement may be filled with the material 54 before any of the material 54 in any of the hoses has had time to cure and solidify. Thus, excessive movement of the conductors in any particular radial direction due to an unfilled hose on the other side of the conductor is eliminated. With this method, the resin material 54 should have a composition which cures after a sufficient length of time to permit the injecting of the material into each hose in the securing arrangement. As an alternative, separate injection apparatus could be used for each hose in the securing system and each hose could be injected at the same time.

As another alternative, fixed spacing blocks could be disposed on one side of the conductors during the injection of the material 54 into the hose on the other side of the conductor, and the fixed blocks replaced by another hose which is then injected with the material 54. The epoxy resin material 54 may contain a high percentage of inert filler, such as silica or chopped glass fiber, to maximize the mechanical properties thereof and to reduce the shrinkage during curing. The amount of filler must be limited to that which would cause the resin to be too viscous to flow through the hoses at a reasonable supply pressure in reasonable periods of time.

The end winding conductor securing arrangement disclosed herein automatically and inherently compensates for differences in the required separation distances between the conductors and their associated support rings. Thus, contrary to the prior art arrangement of using separate support blocks, the exact and desired amount of spacing material between the conductors and the support rings is provided conveniently along with the increased tangential support of the conductors.

What is claimed is:

1. An end winding conductor securing arrangement comprising;
    a circular support ring disposed around a plurality of end winding conductors; and
    a resin filled hose located between the support ring and at least two winding conductors, with the cross-sectional shape of the hose being more circular in the region between adjacent conductors than in the region immediately between the conductors and the support ring.

2. The securing arrangement of claim 1 wherein the ring is positioned around the outside surface defined by the end winding conductors.

3. The securing arrangement of claim 1 wherein the ring is positioned around the inside surface defined by the end winding conductors.

4. The securing arrangement of claim 1 wherein the ring is positioned between a plurality of end winding conductors, with a resin filled hose located on each side of the support ring.

5. The securing arrangement of claim 1 wherein the hose extends substantially around the entire circumference of the support ring.

6. The securing arrangement of claim 1 wherein the hose includes an outer surface of polyester braids and a layer of an elastomeric material positioned between the outer surface of the hose and the resin inside the hose.

7. The securing arrangement of claim 1 wherein the solidified resin within the hose exerts a pressure on the walls of the hose throughout the entire length of the hose.

8. An arrangement for securing the top and bottom end winding conductors of a turbine generator, comprising at least;
    a first support ring positioned around the outside surface defined by the bottom conductors;
    a first resin filled hose positioned between the first support ring and the bottom conductors;
    a second support ring positioned around the inside surface defined by the top conductors;
    a second resin filled hose positioned between the second support ring and the top conductors;
    a third support ring positioned between the top and bottom conductors;
    third and fourth resin filled hoses respectively positioned between the third support ring and the top and bottom conductors;
    each of said hoses extending substantially around the entire circumference of its adjacent support ring, with the cross-sectional shape of each hose being more circular in the region between adjacent conductors than in the region immediately between the conductors and the adjacent support ring, and with the solid resin contained within each hose exerting a pressure on the walls of the hose throughout the entire length of the hose.

* * * * *